US009624668B2

(12) United States Patent
Stanford

(10) Patent No.: US 9,624,668 B2
(45) Date of Patent: *Apr. 18, 2017

(54) POCKETED CONCRETE ANCHOR

(71) Applicant: Actuant Corporation, Menomonee Falls, WI (US)

(72) Inventor: Frantz Stanford, Monona, WI (US)

(73) Assignee: Actuant Corporation, Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,769

(22) Filed: Apr. 15, 2016

(65) Prior Publication Data
US 2016/0230390 A1 Aug. 11, 2016

Related U.S. Application Data

(63) Continuation of application No. 13/808,124, filed as application No. PCT/US2011/043826 on Jul. 13, 2011, now Pat. No. 9,317,191.

(60) Provisional application No. 61/363,889, filed on Jul. 13, 2010.

(51) Int. Cl.
    *A61B 19/00*     (2006.01)
    *E04C 5/12*     (2006.01)
    *G06F 3/0484*     (2013.01)

(52) U.S. Cl.
    CPC ............... *E04C 5/12* (2013.01); *E04C 5/122* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 3,676,031 A * | 7/1972 | Stinton et al. | ............ | E04C 5/12 249/43 |
| 3,757,390 A * | 9/1973 | Edwards | ................. | E04C 5/122 24/115 R |
| 3,833,706 A * | 9/1974 | Edwards | .................... | E04C 5/12 249/190 |

(Continued)

OTHER PUBLICATIONS

PCT International Search Report and Written Opinion for PCT Application No. PCT/US2011/043826 dated Dec. 13, 2011 (9 pages).

*Primary Examiner* — Brian Glessner
*Assistant Examiner* — Adam Barlow
(74) *Attorney, Agent, or Firm* — Michael Best & Friedrich LLP

(57) ABSTRACT

The invention provides for a pocketed anchor for post-tensioned concrete reinforcement. The anchor includes a body having a flange portion with a front and rear surface, a button portion extending from the rear surface, and a nose portion extending from the front surface. The anchor also includes a tapered bore that extends through the nose, flange, and button portions. The bore can receive a wedge that cams against the bore to clamp down on a tendon. The front surface of the flange has at least two planar surfaces that are parallel to the bearing surface on the rear surface of the anchor. One of the planar surfaces is recessed relative to the other such that the recessed surface is closer to the load bearing surface on the rear surface of the anchor. The two planar surfaces define a pocket on the anchor, where mounting holes may be located.

27 Claims, 4 Drawing Sheets

(56) References Cited

U.S. PATENT DOCUMENTS

| | | | | |
|---|---|---|---|---|
| 3,844,697 A * | 10/1974 | Edwards | ............... | E04C 5/12 249/217 |
| 4,663,907 A * | 5/1987 | Garcia-Mansilla Ripoll | ............... | E04C 5/122 52/223.13 |
| 4,719,658 A * | 1/1988 | Kriofske | ............... | E04C 5/122 52/223.13 |
| 4,821,474 A * | 4/1989 | Rodriguez | ............... | E04C 5/12 24/122.6 |
| 4,896,470 A * | 1/1990 | Sorkin | ............... | E04C 5/12 52/223.13 |
| 5,024,032 A * | 6/1991 | Rodriguez | ............... | E04C 5/12 24/122.6 |
| 5,072,558 A * | 12/1991 | Sorkin | ............... | E04C 5/12 52/223.13 |
| 5,079,879 A * | 1/1992 | Rodriguez | ............... | E04C 5/12 24/122.6 |
| 5,263,291 A * | 11/1993 | Knight | ............... | E04C 5/12 52/223.13 |
| 5,271,199 A * | 12/1993 | Northern | ............... | E04C 5/12 24/122.6 |
| 5,347,777 A * | 9/1994 | Sudduth | ............... | E04C 5/122 52/223.13 |
| 5,720,139 A * | 2/1998 | Sorkin | ............... | E04C 5/122 52/223.13 |
| 6,017,165 A * | 1/2000 | Sorkin | ............... | E04C 5/122 403/371 |
| 6,023,894 A * | 2/2000 | Sorkin | ............... | E04C 5/122 24/122.6 |
| 6,027,278 A * | 2/2000 | Sorkin | ............... | E04C 5/122 403/371 |
| 6,234,709 B1 * | 5/2001 | Sorkin | ............... | E04C 5/122 403/371 |
| 6,354,596 B1 * | 3/2002 | Rodriguez | ............... | E04C 5/12 174/153 G |
| 7,676,997 B1 * | 3/2010 | Sorkin | ............... | E04C 5/12 52/223.13 |
| 2002/0129570 A1 * | 9/2002 | Sorkin | ............... | E04C 5/12 52/223.13 |
| 2006/0096196 A1 * | 5/2006 | Hayes | ............... | E04C 5/122 52/223.13 |
| 2006/0179742 A1 * | 8/2006 | Mathews | ............... | E04C 5/122 52/223.13 |

* cited by examiner

POCKETED CONCRETE ANCHOR

CROSS REFERENCE TO RELATED APPLICATIONS

This application is a continuation of prior-filed, co-pending U.S. patent application Ser. No. 13/808,124, filed Jan. 3, 2013, which is a national stage entry of PCT Application No. PCT/US2011/043826, filed Jul. 13, 2011, which claims the benefit of U.S. Provisional Patent Application No. 61/363,889 filed Jul. 13, 2010. The entire contents of these documents are hereby incorporated by reference.

STATEMENT OF FEDERALLY SPONSORED RESEARCH OR DEVELOPMENT

Not applicable.

FIELD OF THE INVENTION

The present invention relates to a system for providing concrete with post-tensioned reinforcement. More specifically, the invention relates to an anchoring structure used in a post-tensioned reinforcement system.

BACKGROUND OF THE INVENTION

Concrete is capable of withstanding significant compressive loads, however, it is not as capable of withstanding significant tensile loads. Thus, it is often necessary to reinforce concrete structures with steel bars, cables, or the like to enhance the structure's ability to withstand tensile forces.

The basic principles of providing such reinforcement to concrete structures are known in the prior art. In a post-tensioned reinforcement system, several steel cables (called "tendons") are placed within the concrete framing structure where the concrete will later be poured around them. At this point, each tendon is held loosely in place, and the ends of each tendon pass through an anchor on each side of the concrete slab that composes a portion of the total concrete structure. Once the concrete is poured and has cured for a sufficient amount of time, but not yet to the point of being fully cured, the tendons may be tensioned by a hydraulic tensioner. The hydraulic jack tensioners that may be used in these circumstances are driven by high pressure hydraulic fluid in one or more cylinders in the tensioner that places the tendon under a high tensile load, for example 30-40,000 pounds force.

A concrete anchor is typically formed as a singular body by casting and includes a body portion that has a flange portion, and two generally cylindrical shaped portions, one extending from the front surface of the flange (nose portion) and one extending from the rear surface of the flange (button portion). To help support the force that will be applied to the tendon after tensioning, the anchor also includes several ribs located on the front surface of the flange. The rear surface of the flange is used to contact the concrete and provide a load bearing surface during the tensioning of the tendon by the hydraulic jack tensioner. The flange portion of the anchor is typically of a constant thickness and includes two or more mounting holes so the anchor can be fastened to the concrete structure, which is often completed with nails or similar fasteners.

The anchors in the prior art also include a bore that extends through the nose portion, the flange portion, and the button portion. The diameter of the bore decreases along the axis of the bore in the direction from the front surface to the rear surface of the flange, with the largest diameter being near the front side of the nose portion. Because of the decreasing diameter, the bore is capable of receiving a wedge that surrounds the tendon.

Before the concrete is poured around the tendons, each tendon must pass through an anchor that will be located on each side of where the concrete slab will eventually be located. The tendon enters the anchor by entering the bore in the button portion on the rear surface of the flange and exiting the bore in the nose portion on the front surface of the flange. After the tendon exits the anchor, the wedge may be placed around the tendon in the frusto-conical bore of the anchor.

After the concrete is poured and allowed to partially cure for a sufficient amount of time, the tendon may be tensioned by a hydraulic jack tensioner. When the tendon is tensioned by the hydraulic jack tensioner, the tendon and wedge are forced tightly into the bore. The wedge is shaped such that it has teeth that help lock the tendon in place during tensioning. The tensioning force on the tendon passes to the wedge and to the nose, button, and flange portions of the anchor, and ultimately to the concrete slab. The ribs help distribute that force throughout the body of the anchor and onto the rear surface of the flange portion of the anchor, thus providing the tensile strength to the concrete structure. After tensioning, the anchor may be kept external to the concrete structure, or alternatively, a concrete section may be poured outside of the anchor to encapsulate the anchor.

Many anchors are used in post-tensioned concrete construction and so it is important that they be efficient in performing their function. Excess material in an anchor leads to increased weight that is unnecessary for the proper functioning of the anchor and results in a waste of raw materials used to compose the concrete anchor, as well as increased shipping costs of the anchor.

SUMMARY OF THE INVENTION

The present invention provides an improved concrete anchor that concentrates mass on the flange near areas of high stress and reduces mass near areas of the flange that are under low stress by providing for a pocket in the flange of the anchor. The structural design of the pocketed anchor decreases the amount of raw material used to create the anchor without negatively affecting the strength of the anchor or its load transferring properties to the concrete structure. In fact, the structural improvements in the design of the present invention increase the effectiveness of the concrete anchor.

The present invention provides an anchor for post-tensioned concrete reinforcement that includes a body having a flange portion with a front surface, a rear surface, an edge surface extending between the front surface and the rear surface, a button portion extending from the rear surface of the flange, and a nose portion extending from the front surface of the flange. The flange extends laterally from the nose portion and from the button portion such that the flange has at least one bearing surface on the rear surface of the flange to one lateral side of the button portion and an opposite surface on the front surface of the flange to the one lateral side of the nose portion opposite from the bearing surface. The present invention also includes a bore that extends through the nose portion, the flange portion, and the button portion, the bore being tapered in diameter in the direction from the nose portion to the button portion to receive a wedge that cams against the bore to clamp down on a tendon that extends into the bore from where the tendon enters the bore through the button portion of the anchor. At least two planar surfaces are parallel to the bearing surface on the front of the flange, with one of the two planar surfaces recessed relative to the other planar surface so that the recessed planar surface is closer to the bearing surface than the other planar surface. The edge surface of the flange extends between the bearing surface and the other planar surface.

One advantage of the present invention is that it provides for a reduction in total raw materials necessary to form the anchor, and thus, creates savings in production of the pocketed concrete anchor. As a result of the reduced raw material used in producing the pocketed concrete anchor, the weight of each concrete anchor is reduced, which in turn results in savings in shipping costs. Importantly, these advantages are not gained at the expense of a loss in performance of the concrete anchor.

In fact, performance of the anchor is improved in that another advantage of the present invention is that the pocket in the anchor's flange provides for an increased surface area of the anchor. The increased surface area of the present invention provides more gripping surface for anchors that are encapsulated in the concrete after tensioning by the hydraulic jack tensioners. This results in a more robust anchor as part of a post-tensioned concrete reinforcement system.

DETAILED DESCRIPTION OF THE PREFERRED EMBODIMENT

Figure 1:
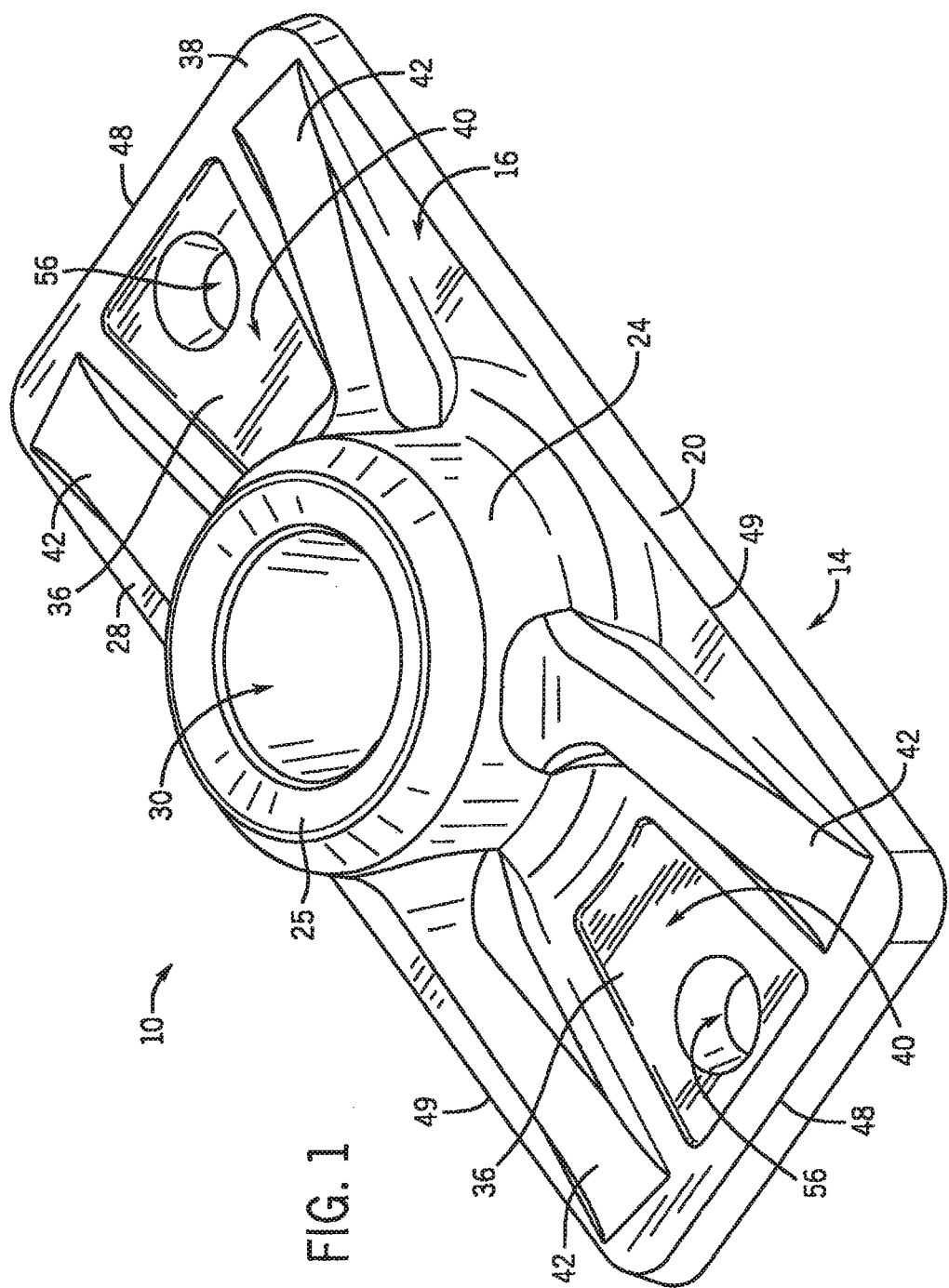
FIG. 1 is a perspective view of a pocketed concrete anchor embodying the invention.
Figure 3:
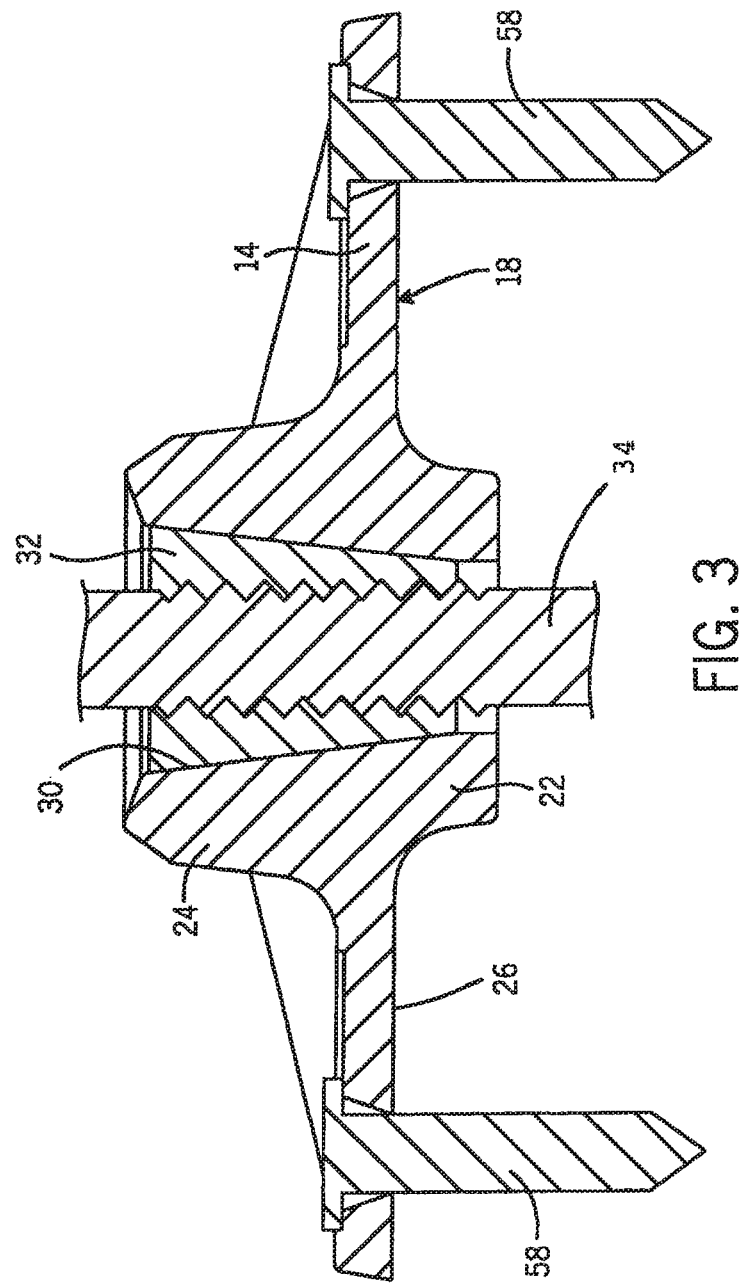
FIG. 3 is a cross-sectional view along line 3-3 showing a pocketed concrete anchor embodying the invention and further showing a wedge, a tendon, and nails.
Figure 4:
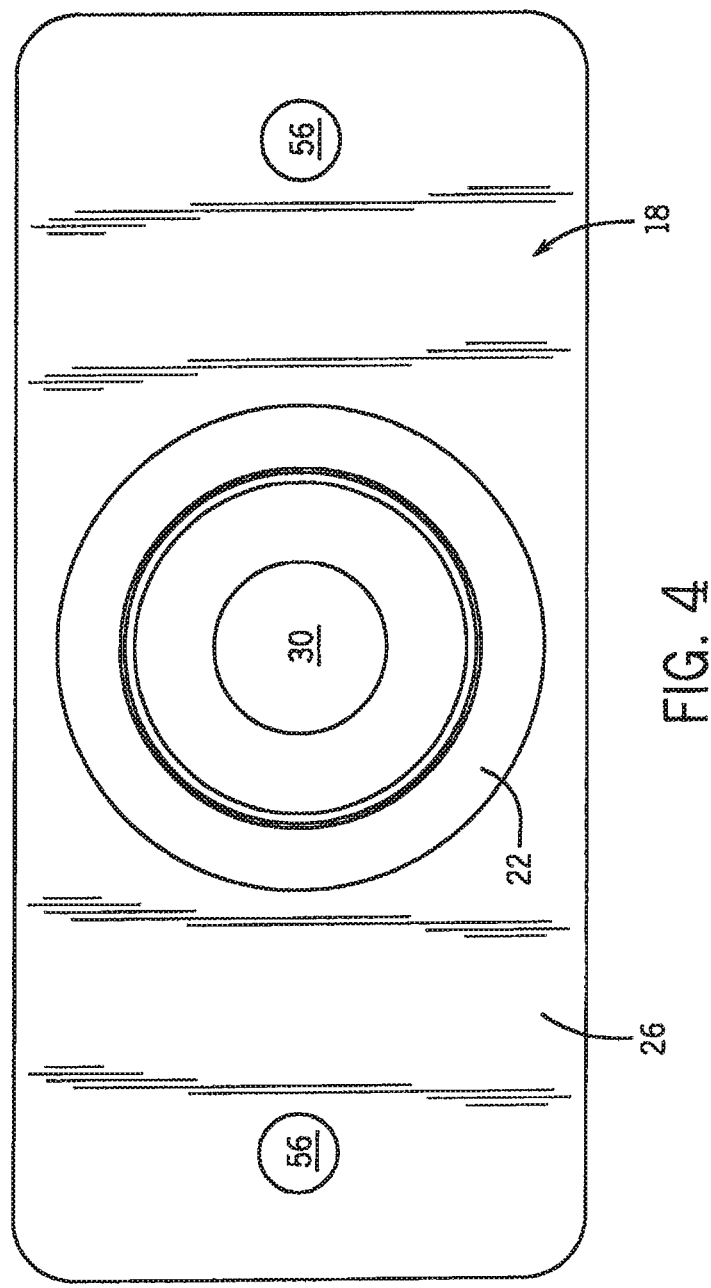
FIG. 4 is a bottom elevation view of a pocketed concrete anchor embodying the invention.

Referring to FIG. 1, a pocketed concrete anchor 10 embodying the present invention is illustrated. The pocketed concrete anchor 10 has a body with a flange portion 14 that has both a front and rear surface 16, 18, as well as an edge surface 20. The body also includes a button portion 22, as seen in FIGS. 3 and 4, that extends from the rear surface 18 of the flange 14 and a nose portion 24 that extends from the front surface 16 of the flange 14. The nose portion 24 may be structured such that it has a seating surface 25 that can engage a hydraulic jack tensioner (not shown) during the tensioning of the tendon 34.

As seen in FIG. 1, the flange 14 may be rectangular in shape and the nose and button portions 24, 22 may be centered on the flange 14. The flange 14 extends laterally from both the nose portion 24 and the button portion 22 to opposite distal edges 48 on the lateral sides of the nose and button portions 24, 22 and to opposite proximal edges 49 on the transverse sides of the nose and button portions 24, 22. The extension of the flange 14 creates a bearing surface 26 on the rear surface 18 of the flange 14 as seen in FIGS. 3 and 4. The anchor 10 includes a surface 28 on the front of the anchor 10, opposite the bearing surface 26, which extends from the nose portion 24 in lateral and transverse directions.

Referring to FIG. 3, the pocketed concrete anchor 10 includes a bore 30 that extends through the nose portion 24, the flange portion 14, and the button portion 22. As seen in FIG. 3, the bore 30 has a diameter that tapers in the direction from the nose portion 24 to the button portion 22 such that the bore 30 is capable of receiving two halves of a wedge 32 that cams against the bore 30 and clamps down on a tendon 34 that extends through the bore 30. The tendon 34 enters the bore 30 through the button portion 22 of the anchor body and exits through the nose portion 24.

Figure 2:
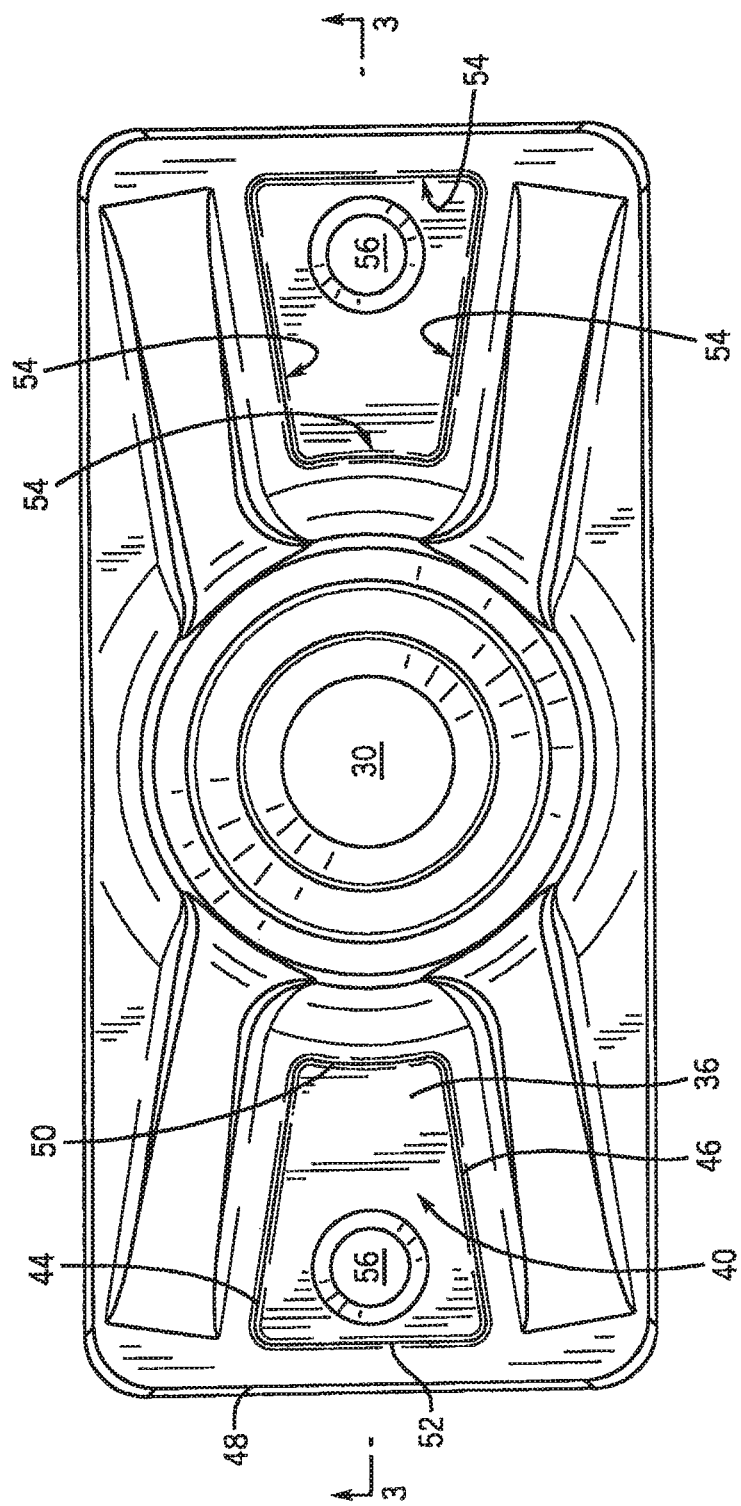
FIG. 2 is a top elevation view thereof.

Returning to FIG. 1, the opposite surface 28 of the flange 14 includes at least two planar surfaces that are parallel to the bearing surface 26, where one of the two planar surfaces is a recessed planar surface 36 that is closer to the bearing surface 26 than the other planar surface 38. The recessed planar surface 36 and the other planar surface 38 define a pocket 40. The edge surface 20 extends between the bearing surface 26 and the un-recessed planar surface 38. As shown in FIGS. 1 and 2, the anchor 10 includes two recessed planar surfaces 36, and thus, two pockets 40, each of which is surrounded by un-recessed or other planar surface 38 on all four sides.

Importantly, the pockets 40 in the anchor 10 only decrease the thickness of the flange portion 14, and do not eliminate the thickness of the flange 14 in certain areas as would drilling holes in the flange portion 14. Although drilling holes in the flange 14 would conserve raw materials in the production of the anchor 10, and thus, result in economical savings in shipping, the pockets 40 do not affect the surface area of the bearing surface 26. A decrease in the area of the bearing surface 26 of the anchor 10 may create a significant negative impact upon the transfer of tensile strength to the concrete structure. The thickness of the flange in the un-recessed area (between surface 38 and surface 26) may be, for example 0.225 inches, and the depth of the recessed areas 40 of the flange may be, for example 0.03 inches.

The anchor 10 also may include ribs 42 that extend between the nose portion 24 and the flange portion 14. As seen in FIGS. 1 and 2, the anchor 10 includes four ribs 42. The ribs 42 may converge toward the nose portion 24 and extend to a point on the nose portion 24 that is spaced forward of the other planar surface 38. In other words, the ribs 42 may increase in thickness as they converge toward the nose portion 24.

As seen in FIG. 2, each pocket 40, and thus a recessed planar surface 36 and the other planar surface 38, is between two ribs 42. Each pocket 40 is generally trapezoidal in shape and is composed of two opposite sides 44, 46 that converge in the direction from an edge 48 of the flange 14 that is distal from the nose portion 24 toward the nose portion 24. In this embodiment, a rib 42 is adjacent to each side 44, 46 of the pocket 40. The pocket 40 also includes an inner edge 50, which may be curved, and an outer edge 52. As shown in FIG. 2, the pocket 40 may end where the ribs 42 end, spaced inwardly from the edge 48. In this embodiment, the outer edge 52 of the pocket 40 is spaced inward from the edge surface 20 of the flange 14 and parallels the distal edge 48 of the flange 14. Each pocket 40 also has walls 54 (four are identified in FIG. 2) that extend from the planar surface 38 to the recessed planar surface 36. Therefore, the walls 54 define the depth of the pocket 40. The walls 54 provide extra surface area to the anchor 10 that contributes more gripping area to be held by concrete for an anchor used in encapsulated applications, where concrete will flow into the pocket when it is being poured.

The pocket 40 may also contain a hole 56 (two are shown in FIGS. 1 and 2) through the recessed planar surface 36. The hole 56 may be located closer to the outer edge 52 of the pocket 40 than it is to the inner edge 50 of the pocket 40. As seen in FIG. 3, the hole 56 provides clearance for a nail 58, or other fastener, to mount the anchor 10 to the concrete slab (not shown), or if the nails 58 are driven in the opposite direction through the holes 56, into a form board (not shown). Although not shown, the mounting holes 56 may be positioned at a location other than in the pocket 40. Moreover, an anchor 10 may be free of any mounting holes 56 altogether and may be attached to the concrete slab or form board by other means.

The pocketed concrete anchor 10 may be formed from metal, such as cast steel or ductile iron, by sand casting. As the accuracy of sand casting is limited, not all surfaces or dimensions will be exact. Thus, when this description defines, refers to, or characterizes a surface, edge, or component using a descriptive term including, but not limited to, parallel, collinear, or planar, such a relationship is fulfilled when it is as close to that condition as the casting method provides under normal operating conditions.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not be limited by the above disclosure.

What is claimed is:

1. An anchor for post-tensioned concrete reinforcement, comprising:
    a body having a flange portion with a front surface, a rear surface, an edge surface extending between the front surface and the rear surface, a button portion extending from the rear surface of the flange, and a nose portion extending from the front surface of the flange, the flange extending laterally from the nose portion and from the button portion so as to have at least one bearing surface on the rear surface of the flange to one lateral side of the button portion and an opposite surface on the front surface of the flange to the one lateral side of the nose portion opposite from the bearing surface;
    ribs on the front surface that extend between the nose portion and the flange portion;
    a bore extending through the nose portion, the flange portion, and the button portion, the bore being tapered in diameter in the direction from the nose portion to the button portion to receive a wedge that cams against the bore to clamp down on a tendon that extends into the bore from where the tendon enters the bore through the button portion;
    wherein the opposite surface on the front of the flange includes at least two planar surfaces that define a pocket on the front surface of the flange; and
    wherein a hole is formed in the pocket and the hole is closer to an outer edge of the pocket than it is to an inner edge of the pocket.

2. The anchor for post-tensioned concrete reinforcement according to claim 1, wherein the pocket is formed by one of the two planar surfaces being recessed relative to the other planar surface so that the recessed planar surface is closer to the bearing surface than the other planar surface and the recessed planar surface is surrounded by the other planar surface on at least three sides.

3. The anchor for post-tensioned concrete reinforcement according to claim 2, wherein the recessed planar surface is surrounded by the other planar surface.

4. The anchor for post-tensioned concrete reinforcement according to claim 2, wherein walls extend between the two planar surfaces and define the depth of the pocket on all four sides of the pocket.

5. The anchor for post-tensioned concrete reinforcement according to claim 1, wherein the flange is rectangular, the nose and the button are centered on the flange, and the pocket is located between the nose and a distal edge of the flange.

6. The anchor for post-tensioned concrete reinforcement according to claim 1, wherein the pocket is spaced inward from the edge surface of the flange portion.

7. The anchor for post-tensioned concrete reinforcement according to claim 1, wherein the ribs include two ribs that converge toward one another in a direction toward the nose portion,
    wherein the pocket is positioned between the two ribs.

8. The anchor for post-tensioned concrete reinforcement according to claim 1, wherein an inner edge of the pocket is curved.

9. The anchor for post-tensioned concrete reinforcement according to claim 1, wherein the pocket is generally trapezoidal in shape.

10. The anchor for post-tensioned concrete reinforcement according to claim 1, wherein the pocket has two opposite sides that converge in a direction from an edge of the flange that is distal from the nose portion toward the nose portion.

11. An anchor for post-tensioned concrete reinforcement, comprising:
    a body having a flange portion with a front surface, a rear surface, an edge surface extending between the front surface and the rear surface, a button portion extending from the rear surface of the flange, and a nose portion extending from the front surface of the flange, the flange extending laterally from the nose portion and from the button portion so as to have at least one bearing surface on the rear surface of the flange to one lateral side of the button portion and an opposite surface on the front surface of the flange to the one lateral side of the nose portion opposite from the bearing surface;
    ribs on the front surface that extend between the nose portion and the flange portion;
    a bore extending through the nose portion, the flange portion, and the button portion, the bore being tapered in diameter in the direction from the nose portion to the button portion to receive a wedge that cams against the bore to clamp down on a tendon that extends into the bore from where the tendon enters the bore through the button portion;
    wherein the opposite surface on the front of the flange includes at least two planar surfaces that define a pocket on the front surface of the flange; and
    wherein an inner edge of the pocket is curved.

12. The anchor for post-tensioned concrete reinforcement according to claim 11, wherein the pocket is formed by one of the two planar surfaces being recessed relative to the other planar surface so that the recessed planar surface is closer to the bearing surface than the other planar surface and the recessed planar surface is surrounded by the other planar surface on at least three sides.

13. The anchor for post-tensioned concrete reinforcement according to claim 12, wherein the recessed planar surface is surrounded by the other planar surface.

14. The anchor for post-tensioned concrete reinforcement according to claim 12, wherein walls extend between the two planar surfaces and define the depth of the pocket on all four sides of the pocket.

15. The anchor for post-tensioned concrete reinforcement according to claim 11, wherein the flange is rectangular, the nose and the button are centered on the flange, and the pocket is located between the nose and a distal edge of the flange.

16. The anchor for post-tensioned concrete reinforcement according to claim 11, wherein the pocket is spaced inward from the edge surface of the flange portion.

17. The anchor for post-tensioned concrete reinforcement according to claim 11, wherein the ribs include two ribs that converge toward one another in a direction toward the nose portion, wherein the pocket is positioned between the two ribs.

18. The anchor for post-tensioned concrete reinforcement according to claim 11, wherein the pocket is generally trapezoidal in shape.

19. The anchor for post-tensioned concrete reinforcement according to claim 11, wherein the pocket has two opposite sides that converge in a direction from an edge of the flange that is distal from the nose portion toward the nose portion.

20. An anchor for post-tensioned concrete reinforcement, comprising:
   a body having a flange portion with a front surface, a rear surface, an edge surface extending between the front surface and the rear surface, a button portion extending from the rear surface of the flange, and a nose portion extending from the front surface of the flange, the flange extending laterally from the nose portion and from the button portion so as to have at least one bearing surface on the rear surface of the flange to one lateral side of the button portion and an opposite surface on the front surface of the flange to the one lateral side of the nose portion opposite from the bearing surface;
   ribs on the front surface that extend between the nose portion and the flange portion;
   a bore extending through the nose portion, the flange portion, and the button portion, the bore being tapered in diameter in the direction from the nose portion to the button portion to receive a wedge that cams against the bore to clamp down on a tendon that extends into the bore from where the tendon enters the bore through the button portion;

wherein the opposite surface on the front of the flange includes at least two planar surfaces that define a pocket on the front surface of the flange; and wherein walls extend between the two planar surfaces and define a depth of the pocket on all four sides of the pocket.

21. The anchor for post-tensioned concrete reinforcement according to claim 20, wherein the pocket has one of the two planar surfaces recessed relative to the other planar surface so that the recessed planar surface is closer to the bearing surface than the other planar surface and the recessed planar surface is surrounded by the other planar surface on at least three sides.

22. The anchor for post-tensioned concrete reinforcement according to claim 21, wherein the recessed planar surface is surrounded by the other planar surface.

23. The anchor for post-tensioned concrete reinforcement according to claim 20, wherein the flange is rectangular, the nose and the button are centered on the flange, and the pocket is located between the nose and a distal edge of the flange.

24. The anchor for post-tensioned concrete reinforcement according to claim 20, wherein the pocket is spaced inward from the edge surface of the flange portion.

25. The anchor for post-tensioned concrete reinforcement according to claim 20, wherein the ribs include two ribs that converge in a direction toward the nose portion, wherein the pocket is positioned between the two ribs.

26. The anchor for post-tensioned concrete reinforcement according to claim 20, wherein the pocket is generally trapezoidal in shape.

27. The anchor for post-tensioned concrete reinforcement according to claim 20, wherein the pocket has two opposite sides that converge in a direction from an edge of the flange that is distal from the nose portion toward the nose portion.

* * * * *